United States Patent [19]

Betensky

[11] Patent Number: 4,466,708

[45] Date of Patent: Aug. 21, 1984

[54] ZOOM LENS

[75] Inventor: Ellis I. Betensky, New York, N.Y.

[73] Assignee: Vivitar Corporation, Santa Monica, Calif.

[21] Appl. No.: 423,735

[22] Filed: Sep. 28, 1982

Related U.S. Application Data

[63] Continuation-in-part of Ser. No. 335,151, Dec. 28, 1981, abandoned.

[51] Int. Cl.³ ............................................. G02B 15/18
[52] U.S. Cl. ................................................... 350/427
[58] Field of Search ...................... 350/423, 427, 428

[56] References Cited

U.S. PATENT DOCUMENTS

| | | | |
|---|---|---|---|
| 3,074,317 | 1/1963 | Cox et al. | 350/427 |
| 3,840,290 | 10/1974 | Betensky et al. | 350/427 |
| 3,975,089 | 8/1976 | Betensky | 350/427 |
| 4,172,635 | 10/1979 | Ogino | 350/426 |
| 4,303,311 | 12/1981 | Nakamura | 350/427 |
| 4,306,776 | 12/1981 | Someya | 350/427 |
| 4,307,943 | 12/1981 | Betensky et al. | 350/428 |

FOREIGN PATENT DOCUMENTS

| | | | |
|---|---|---|---|
| 222910 | 8/1962 | Austria | 350/427 |
| 732860 | 4/1966 | Canada | 350/427 |
| 1148776 | 5/1963 | Fed. Rep. of Germany | 350/427 |
| 2556964 | 12/1975 | Fed. Rep. of Germany | 350/427 |
| 1439207 | 8/1966 | France | 350/427 |
| 419648 | 3/1967 | Switzerland | 350/427 |
| 893653 | 4/1962 | United Kingdom | 350/427 |
| 1028353 | 5/1966 | United Kingdom | 350/427 |

Primary Examiner—John K. Corbin
Assistant Examiner—Scott J. Sugarman
Attorney, Agent, or Firm—Costas, Montgomery & Dorman

[57] ABSTRACT

A zoom lens which will continuous close focus to a magnification of 1:4, comprising three groups where the third group from the object end is stationary, the second group moves axially to vary the equivalent focal length, and the first group moves axially in predetermined relation to the second group to compensate for the variation in focal length, and is also independently movable axially to focus the lens.

30 Claims, 9 Drawing Figures

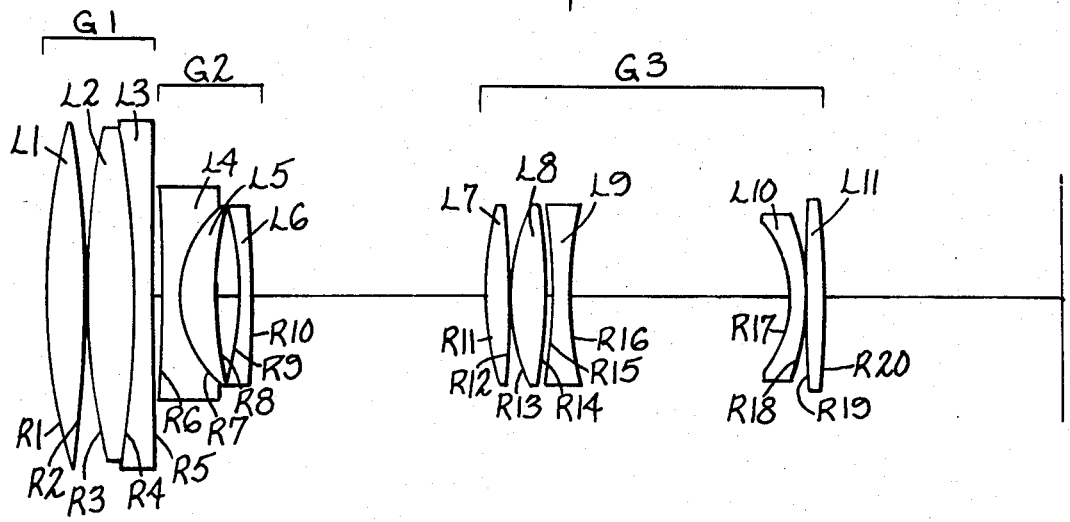
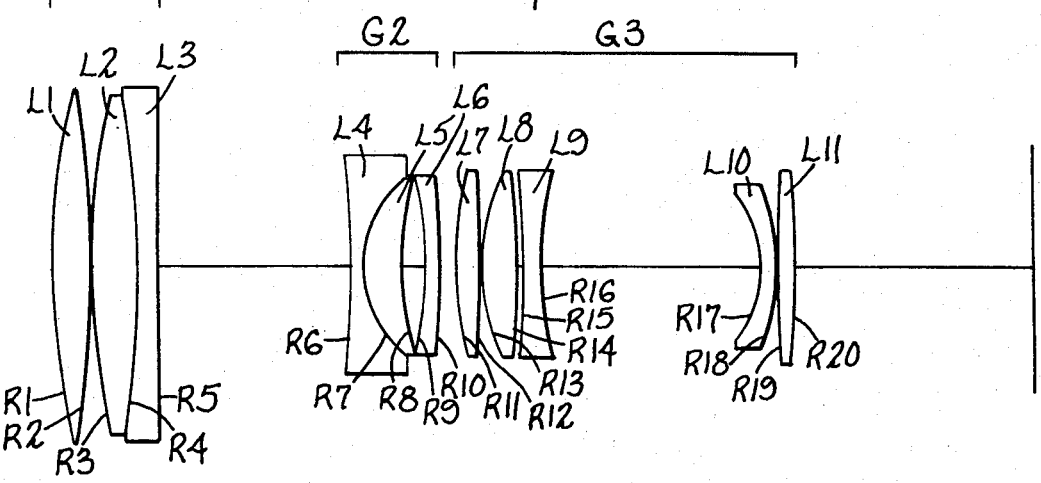
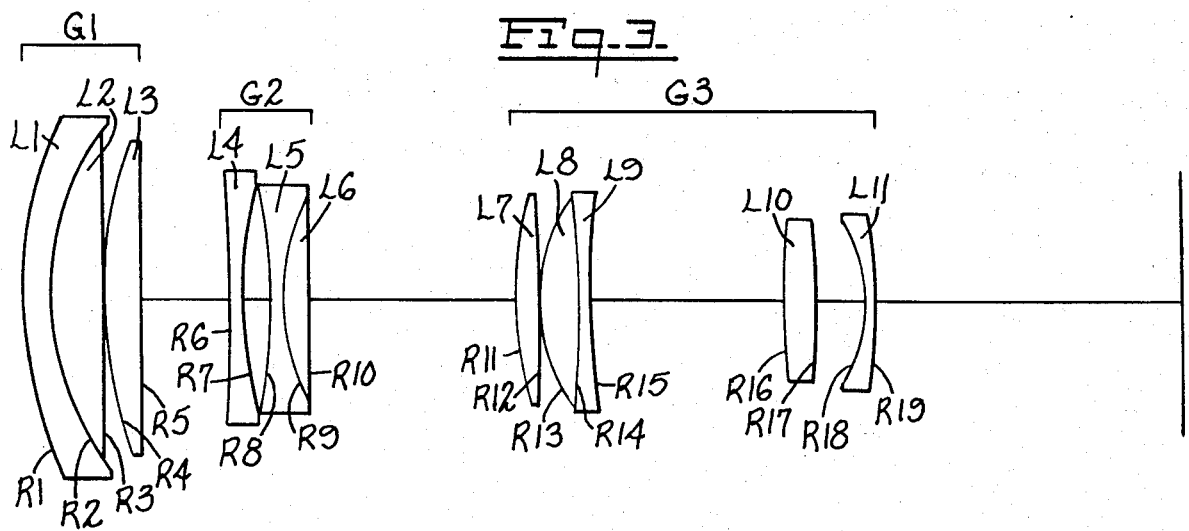

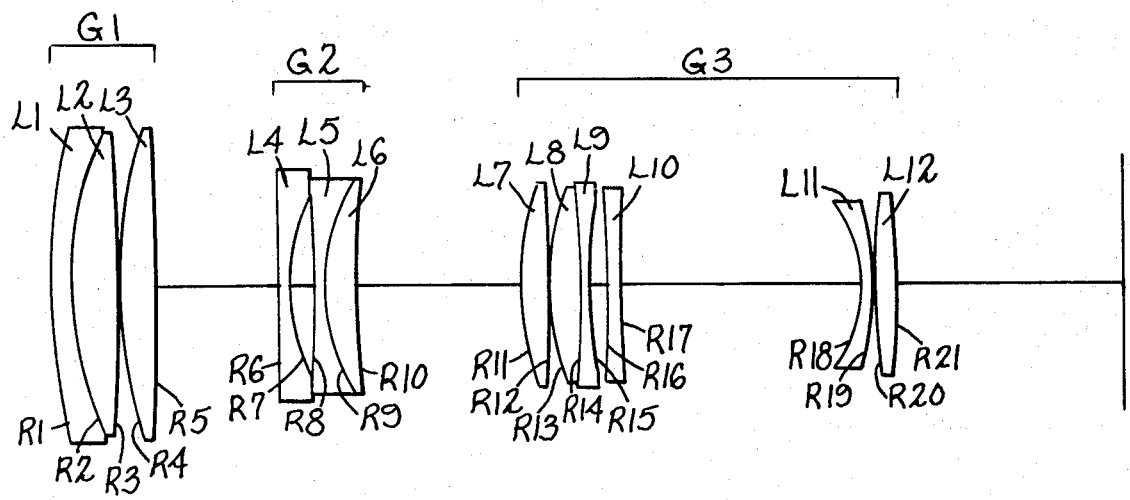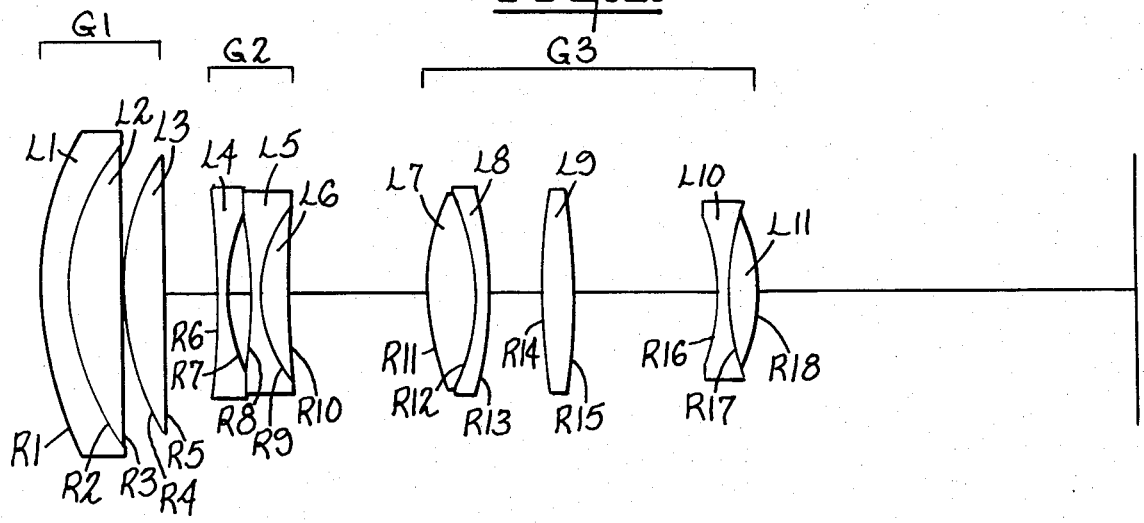

ZOOM LENS

RELATED APPLICATIONS

This application is a continuation-in-part of application Ser. No. 334,151 filed Dec. 28, 1981.

FIELD OF INVENTION

This invention relates to zoom lenses and more particularly relates to zoom lenses having a capability of focusing continuously from infinity to a very close distance from the image plane without the necessity of changing the movements of one or more zooming groups to achieve close focusing.

BACKGROUND OF THE INVENTION

In most zoom lenses the front group of lens elements is moved along the optical axis to achieve focusing from infinity to moderately close distances, typically having a magnification of 1:10 or less. To enable these lenses to focus still closer, in a macro or close focusing mode, the lens is adjusted by suitable repositioning of one or more of the zooming groups (the variator group and compensator group) in a manner different from the movements in the normal zoom range.

An example of such optics is disclosed in U.S. Pat. No. 3,817,600 where the zooming elements are moved in relationship different from the normal zooming movements to achieve close focusing below two meters up to a magnification of 1:2.2 as close as forty-five centimeters from the front element. In this lens, the variator and compensator are moved in fixed relation. In other lenses, the variator may be moved independent of movement of the compensator to achieve closer focusing than the normal zoom range.

A lens of this type disclosed in U.S. Pat. No. 3,817,600 has proven to be an excellent optic and has been marketed as a Vivitar Series I Lens of 70–210 mm equivalent focal length. In the close focusing mode, it is possible to achieve magnifications of 1:2.2. However, this lens does require repositioning of the zooming groups for different movements for close focusing.

Zoom lenses generally do not have an optically strong front group. Conventional zoom lenses are characterized by a weak power (long focal length) first group, which has been believed to be the best way to minimize aberration change due to focusing.

The present invention provides a compact mechanically compensated zoom lens having the capability of focusing continuously from infinity down to the macro or close focusing mode by small movements of a front focusing group while maintaining compactness of the lens.

SUMMARY OF THE INVENTION

In the present invention, compactness of the lens and close focusing capability to a magnification of 1:4 at the long focal length may be achieved by the selection of the relative powers of the lens group and appropriate design of the front focusing group in relation to the overall lens. This design overcomes the usual design shortcomings by having stability of spherical aberration with conjugate change, strong power, and simple construction. These generally are considered to be conflicting parameters. It is well known that the front group is required to be quite stable with respect to variation of spherical aberration over the focusing range. However, it is also desirable that the front group have strong power to provide a compact system and to reduce as much as possible the required focusing motion. In addition, it is mechanically convenient that the front group be of simple construction so that the weight of the lens is reduced. This is particularly important in maintaining the balance of a lens with a large focusing range, normally resulting in a long lens travel to achieve close focusing. It is also desirable to achieve the above-mentioned effects in a compact optical system having a relatively fast aperture.

The benefits of a compact lens design and continuous focusing from the most distant focus position to the close focus position are achieved through the proper choice of the relationship between the topical power of the front focusing group and the optical power of the overall lens, and by utilizing a two-component front focusing group where the optical powers of the two components are in a predetermined relation to each other.

Through the proper selection of the above-mentioned parameters and the optical powders of the lens groups for a given focal length range, a three-group compact, simple, lightweight, and continuous close focusing zoom lens with a relatively fast aperture may be designed using lens movements similar to those described in U.S. Pat. No. 3,074,317.

Briefly stated, the invention in one form thereof consists of a compact telephoto zoom lens which comprises a front group of two positive components, a second negative group, and a third positive group. The first and second groups are movable for zooming while the third group is stationary. The front group is movable independently for focusing. The front group comprises a positive singlet and a positive doublet, in either order. The second group comprises a negative meniscus and a negative doublet in either order, and the third group preferably comprises an object side positive sub-group and a widely spaced image side negative sub-group but may take other forms.

A lens embodying the invention may be designed for various focal length ranges by satisfying the following conditions:

$$2.0 > K_1/K_m > 1.0$$

$$-6.0 > K_2/K_M > -3.0$$

$$3.0 > K_3/K_m > 2.0$$

where $K_1$, $K_2$, and $K_3$ are the powers of the first, second and third lens groups respectively, and $K_M$ is the geometric mean focal length of the lens determined by the square root of the product of the powders of the lens at the extremes of its focal range given by the expression $K_M = \sqrt{K_L K_S}$ where $K_L$ is the power of the lens at its longest equivalent focal length and $K_S$ is the power of the lens at its shortest equivalent focal length.

Where the lens is designed for continuous close focusing the equivalent focal length (EFL) of the front focusing group ($F_1$) bears the following relation to the EFL of the lens at its longest focal length ($F_L$)

$$0.6 > F_1/F_L > 0.2$$

The ratio of the power of the positive doublet component ($K_D$) of the front focusing group to the power of the singlet ($K_S$) is An object of this invention is to provide a new and improved lightweight zoom lens with a relatively fast aperture, well corrected, and with a reduced number of elements.

Another object of this invention is to provide a compact zoom lens which is capable of focusing continuously from infinity to the close focus mode while moving only the front group, where the telephoto ratio of the lens in the long EFL position may be less than unity.

The features of the invention which are believed to be novel are particularly pointed out and distinctly claimed in the concluding portion of this specification, The invention, however, together with further objects and negative advantages thereof may best be appreciated by reference to the following detailed description of the invention together with the following drawings.

DESCRIPTION OF THE DRAWINGS

FIG. 1 is a diagrammatic side view of a lens embodying the invention at its shortest equivalent focal length;

FIG. 2 is a diagrammatic side view of the lens of FIG. 1 with the lens groups positioned at their longest focal length position;

FIGS. 3 through 9 show additional embodiments of the invention with the lens groups positioned at an intermediate focal length position.

DETAILED DESCRIPTION OF THE PREFERRED EMBODIMENT

Figure 6:
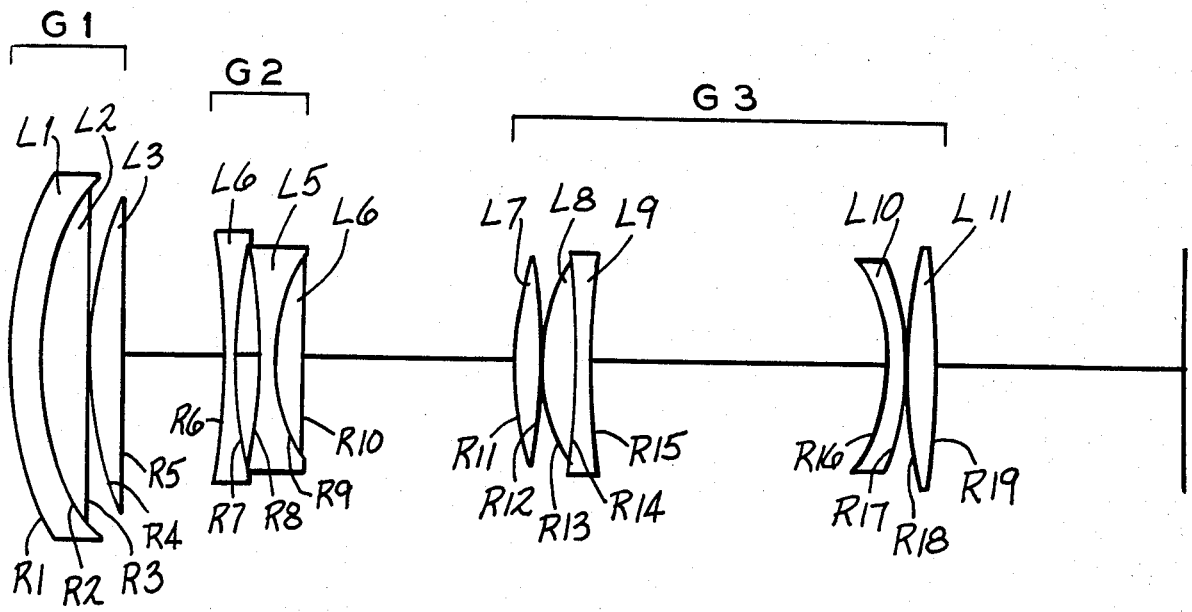

A lens embodying the invention as exemplified in FIGS. 1 and 2 includes a relatively strong positive first Group G1 as hereinafter described which is movable axially for both focusing and zooming the optical system. The second Group G2 is a negative power group and is also movable along the optical axis for varying the equivalent focal length of the entire lens. The two groups, G1 and G2, are moved relative to each other and relative to stationary Group G3 during zooming. During focusing, however, G1 alone is moved while G2 and G3 remain fixed. The third Group G3 remains fixed with respect to the image plane at all times. Group G3 is of the positive telephoto form comprising an object side positive sub-group widely spaced from an image side negative sub-group.

In the embodiment of the invention shown in FIG. 1, the first positive Group G1 comprises two positive components, a positive singlet L1 followed by a positive doublet L2, L3. As shown in FIGS. 3, 4 and 5, the first positive Group G1 may consist in the alternative of a positive doublet L1, L2, followed by the positive singlet L3.

The components of Group G1 in all embodiments of the invention must satisfy the condition:

$$0.2 < K_D/K_S < 1.6$$

where $K_D$ designates the power of the doublet component within the first Group G1, and $K_S$ designates the power of the singlet compound of the first Group G1, regardless of whether the singlet is on the image side or object side of the doublet. Also, in each embodiment of the invention the focal length of Group G1 bears the following relationship to the equivalent focal length of the entire lens at its longest equivalent focal length:

$$0.2 < F_1/F_L < 0.6$$

where $F_1$ is the equivalent focal length (EFL) of the first Group G1, and $F_L$ is the longest equivalent focal length of the entire lens.

The parameters set forth are necessary for suitably balancing the aberrations of the lens system, when the lens is focused across the intended broad range. Together, the conditions prevent or significantly reduce aggravation of spherical aberration and astigmatism which may occur as the angles of the incident light rays change due to focusing of the lens from distant to extremely close objects. Satisfaction of these parameters ensures a compact lens with a relatively short focusing motion which is free from significant distortion. As set forth hereinafter, the dimensions, relationships, and parameters of the lenses are such as to satisfy the conditions as set forth above.

The first parameter $(0.2 < K_D/K_S < 1.6)$ yields the distribution of power necessary for stability of spherical aberration with respect to conjugate change.

The second parameter $(0.2 < F_1/F_L < 0.6)$ provides the relationship between the focal length F of the focusing Group G1 and the necessary focusing travel FT for a given object distance OD namely:

$$OD = \frac{F_1^2}{FT}$$

where OD is the object distance, $F_1$ is the equivalent focal length of the first focusing Group G1 and FT is the focusing travel of the first group from infinity to the closest focusing distance. In order to maintain a compact lens design which remains balanced as G1 is moved for focusing, it is necessary to keep the focusing travel FT at a minimum. This in turn necessitates a powerful first Group G1 with a short focal length $F_1$ if a small object distance is to be obtained.

If the power of the first Group G1 becomes too strong, or stated alternatively, $F_1$ becomes too short, it is difficult or impossible to satisfactorily correct the spherical aberration and astigmatism over the complete range of focus.

The ratio of $F_1/F_L$ is chosen greater than the specified lower bound to maintain satisfactory correction of spherical aberration and astigmatism, and lesser than the upper bound to obtain close focusing with a short focusing travel FT.

The first lens Group G1 as shown in FIG. 1 includes a positive bi-convex lens element L1 followed by an overall positive doublet comprising a positive bi-convex element L2 and a negative element L3. These elements are in fixed relation, adapted to be shifted axially as a group both during focusing and during zooming. The relatively strong power in Group G1 reduces the focusing travel as will be apparent from the foregoing equation. As shown in FIGS. 3, 4 and 5, Group G1 may consist of a positive doublet followed by a positive singlet as an alternative to the form shown in FIG. 1.

The second lens Group G2 is negative and is air-spaced from the first Group G1 by a variable amount. As shown in FIG. 1, Group G2 includes a negative bi-concave doublet L4, L5 which is separated from a negative meniscus L6. These two elements are in fixed relation and are adapted to be shifted axially as a group during zooming, but do not move during focusing. As can be seen in FIGS. 3, 4, and 5, Group G2 may consist of a negative singlet L4 followed by a negative doublet L5, L6, as an alternative to the form shown in FIG. 1.

The relay Group G3 is of a telephoto form and is usually divided into two separate spaced sub-groups or components. The forward or object side component has overall positive power and is fixed relative to the rear component of that group. The rear component has overall negative power and is fixed relative to the image plane. To maintain the overall lens compact, it is preferred to maintain the telephoto ratio (EFL when focused to infinity/front vertex distance) of the third group small, preferably unity or less. However, in some of the following examples this value is exceeded. Telephoto Group G3 may consist of any of several embodiments shown in FIGS. 1 through 9. FIG. 1 shows the front positive sub-group of G3 consisting of a positive bi-convex lens element L7 followed by a doublet with an air-gap between its front bi-convex element L8 and its rear bi-concave element L9. The negative rear sub-group of G3 shown in FIG. 1 consists of a negative element L10 followed by a positive element L11 forming a pair with overall negative power.

In the following tables, various embodiments of the invention are set forth for various equivalent focal length ranges, with the parameters of the invention. In the following prescription tables, the reference L followed by an arabic numeral indicates the lens element progressively from the object end to the image end of the lens. The reference radius numbers R are the progressive lens surface radii. Positive surface radii are struck from the right of the lens surface on the optical axis. Negative radii are struck from the left of the lens surface on the optical axis. $N_d$ is the index of refraction of the lens elements. $V_d$ is the dispersion of the lens elements as measured by the Abbe number. The spaces Z are spaces between lens groups which vary with change in EFL. FVD is the front vertex distance measured from the front surface of the lens on the object side of the film plane to the image plane. The FVD provides a measure of the overall compactness of the lens for comparison to the longest EFL.

A lens as shown in FIG. 1 and FIG. 2 scaled to an image frame of 24×36 mm and EFL's of 72.0 mm to 195.8 mm is substantially described in Table 1.

TABLE I

| Element | Radius of Curvature (mm) | | Axial Distance Between Surfaces (mm) | $N_d$ | $V_d$ |
|---|---|---|---|---|---|
| L1 | R1 | = 100.61 | | | |
| | | | 6.50 | 1.500 | 66.4 |
| | R2 | = −208.00 | | | |
| | | | .20 | | |
| L2 | R3 | = 108.10 | | | |
| | | | 8.10 | 1.534 | 62.0 |
| L3 | R4 | = −130.00 | | | |
| | | | 3.50 | 1.797 | 26.8 |
| | R5 | = 965.06 | | | |
| | | | Z1 | | |
| L4 | R6 | = −608.86 | | | |
| | | | 2.30 | 1.794 | 48.2 |
| L5 | R7 | = 21.02 | | | |
| | | | 5.10 | 1.847 | 23.9 |
| | R8 | = 47.40 | | | |
| | | | 3.81 | | |
| L6 | R9 | = −61.93 | | | |
| | | | 2.00 | 1.815 | 44.9 |
| | R10 | = −717.67 | | | |
| | | | Z2 | | |
| L7 | R11 | = 58.55 | | | |
| | | | 3.70 | 1.742 | 49.1 |
| | R12 | = −206.21 | | | |
| | | | .20 | | |

TABLE I-continued

| Element | Radius of Curvature (mm) | | Axial Distance Between Surfaces (mm) | $N_d$ | $V_d$ |
|---|---|---|---|---|---|
| | R13 | = 27.13 | | | |
| | | | 6.80 | | 68.4 |
| | R14 | = −73.05 | | | |
| | | | .59 | | |
| L9 | R15 | = −74.44 | | | |
| | | | 3.00 | 1.805 | 25.5 |
| | R16 | = 83.46 | | | |
| | | | 36.59 | | |
| L10 | R17 | = −16.48 | | | |
| | | | 2.00 | 1.843 | 38.7 |
| | R18 | = −31.29 | | | |
| | | | .20 | | |
| L11 | R19 | = 144.41 | | | |
| | | | 3.40 | 1.796 | 25.5 |
| | R20 | = −79.57 | | | |

A lens stop with a clear aperture of 22.99 mm is located 2.0 mm after R16 and 34.59 mm ahead of R17.

| | Zoom Spacing | | |
|---|---|---|---|
| EFL (mm) | $Z_1$ (mm) | $Z_2$ (mm) | FVD (mm) |
| 72.0 | 1.50 | 41.00 | 169.47 |
| 134.9 | 25.84 | 21.49 | 174.25 |
| 195.8 | 34.46 | 2.55 | 163.89 |

A lens as shown in FIG. 3 scaled to an image frame of 24×36 mm and EFL's of 70.0 mm to 199.9 mm is substantially described in Table II.

TABLE II

| Element | Radius of Curvature (mm) | | Axial Distance Between Surfaces (mm) | $N_d$ | $V_d$ |
|---|---|---|---|---|---|
| L1 | R1 | = 78.89 | | | |
| | | | 3.50 | 1.805 | 25.5 |
| | R2 | = 42.10 | | | |
| L2 | | | 9.00 | 1.665 | 51.7 |
| | R3 | = 6349.49 | | | |
| | | | .35 | | |
| L3 | R4 | = 74.28 | | | |
| | | | 6.00 | 1.482 | 71.1 |
| | R5 | = −2197.53 | | | |
| | | | Z1 | | |
| L4 | R6 | = −277.73 | | | |
| | | | 2.00 | 1.785 | 48.5 |
| | R7 | = 48.38 | | | |
| | | | 4.80 | | |
| | R8 | = −100.61 | | | |
| L5 | | | 2.00 | 1.745 | 48.5 |
| L6 | R9 | = 28.54 | | | |
| | | | 4.00 | 1.817 | 25.0 |
| | R10 | = 201.69 | | | |
| | | | Z2 | | |
| | R11 | = 80.69 | | | |
| L7 | | | 3.50 | 1.487 | 70.4 |
| | R12 | = −195.77 | | | |
| | | | .20 | | |
| L8 | R13 | = 32.44 | | | |
| | | | 6.50 | 1.487 | 70.4 |
| | R14 | = −90.94 | | | |
| L9 | | | 1.50 | 1.793 | 26.0 |
| | R15 | = 212.82 | | | |
| | | | 32.94 | | |
| | R16 | = 225.23 | | | |
| L10 | | | 5.00 | 1.805 | 25.5 |
| | R17 | = −131.05 | | | |
| | | | 8.02 | | |
| | R18 | = −24.27 | | | |
| L11 | | | 2.00 | 1.809 | 40.4 |
| | R19 | = −55.49 | | | |

A lens stop with a clear aperture of 28.04 mm is located 9.68 mm after R19.

| EFL (mm) | Zoom Spacing | | FVD (mm) |
|---|---|---|---|
| | Z₁ (mm) | Z₂ (mm) | |
| 70.0 | .50 | 71.45 | 212.94 |
| 135.0 | 15.31 | 35.97 | 192.27 |
| 199.9 | 20.50 | .50 | 161.95 |

A lens as shown in FIG. 4 scaled to an image frame of 24×36 mm and EFL's of 72.2 mm to 193.7 mm is substantially described in Table III.

TABLE III

| Element | | Radius of Curvature (mm) | Axial Distance Between Surfaces (mm) | $N_d$ | $V_d$ |
|---|---|---|---|---|---|
| L1 | R1 = | 117.60 | | | |
| | | | 3.00 | 1.785 | 26.1 |
| | R2 = | 60.14 | | | |
| L2 | | | 8.10 | 1.517 | 64.2 |
| | R3 = | −343.26 | | | |
| | | | .10 | | |
| | R4 = | 75.57 | | | |
| L3 | | | 6.00 | 1.517 | 64.2 |
| | R5 = | −960.00 | | | |
| | | | Z1 | | |
| | R6 = | −773.48 | | | |
| L4 | | | 2.00 | 1.720 | 50.3 |
| | R7 = | 55.15 | | | |
| | | | 3.85 | | |
| | R8 = | −78.38 | | | |
| L5 | | | 2.00 | 1.743 | 49.2 |
| | R9 = | 32.58 | | | |
| L6 | | | 5.05 | 1.805 | 25.5 |
| | R10 = | 219.88 | | | |
| | | | Z2 | | |
| | R11 = | 45.80 | | | |
| L7 | | | 5.10 | 1.667 | 48.3 |
| | R12 = | −160.00 | | | |
| | | | .20 | | |
| | R13 = | 36.25 | | | |
| L8 | | | 5.40 | 1.517 | 64.2 |
| | R14 = | −188.96 | | | |
| L9 | | | 1.50 | 1.805 | 25.5 |
| | R15 = | 101.76 | | | |
| | | | 3.22 | | |
| | R16 = | −169.64 | | | |
| L10 | | | 2.00 | 1.805 | 25.5 |
| | R17 = | 270.68 | | | |
| | | | 42.53 | | |
| | R18 = | −18.37 | | | |
| L11 | | | 2.00 | 1.743 | 49.2 |
| | R19 = | −38.30 | | | |
| | | | .20 | | |
| | R20 = | 117.60 | | | |
| L12 | | | 3.90 | 1.626 | 35.7 |
| | R21 = | −76.42 | | | |

A lens stop with a clear aperture of 18.3 mm is positioned 21.81 mm after R17 and 21.72 mm ahead of R18. An aperture stop with a variable aperture of 25.00 mm maximum diameter is positioned 2.07 mm after R17 and 49.46 mm ahead of R18.

| EFL (mm) | Zoom Spacing | | FVD (mm) |
|---|---|---|---|
| | Z₁ (mm) | Z₂ (mm) | |
| 72.2 | 1.46 | 59.14 | 195.79 |
| 135.2 | 21.38 | 29.25 | 185.81 |
| 193.7 | 28.26 | 1.45 | 164.89 |

A lens as shown in FIG. 5 scaled to an image frame of 24×36 mm and EFL's of 70.0 mm to 199.9 mm is substantially described in Table IV.

TABLE IV

| Element | | Radius of Curvature (mm) | Axial Distance Between Surfaces (mm) | $N_d$ | $V_d$ |
|---|---|---|---|---|---|
| L1 | R1 = | 60.78 | | | |
| | | | 3.50 | 1.837 | 23.6 |
| | R2 = | 35.72 | | | |
| L2 | | | 9.00 | 15.54 | 59.5 |
| | R3 = | −1501.55 | | | |
| | | | .35 | | |
| | R4 = | 37.45 | | | |
| L3 | | | 7.00 | 1.485 | 68.5 |
| | R5 = | −807.56 | | | |
| | | | Z1 | | |
| | R6 = | −260.37 | | | |
| L4 | | | 2.00 | 1.728 | 54.7 |
| | R7 = | 28.81 | | | |
| | | | 4.00 | | |
| | R8 = | −61.32 | | | |
| L5 | | | 1.80 | 1.788 | 43.4 |
| | R9 = | 21.60 | | | |
| L6 | | | 4.50 | 1.854 | 23.1 |
| | R10 = | 151.89 | | | |
| | | | Z2 | | |
| | R11 = | 50.66 | | | |
| L7 | | | 8.50 | 1.492 | 65.4 |
| | R12 = | −27.43 | | | |
| L8 | | | 1.50 | 1.849 | 23.1 |
| | R13 = | −66.89 | | | |
| | | | 9.99 | | |
| | R14 = | 91.86 | | | |
| L9 | | | 5.00 | 1.794 | 34.7 |
| | R15 = | −84.59 | | | |
| | | | 25.25 | | |
| | R16 = | −29.20 | | | |
| L10 | | | 2.00 | 1.860 | 42.5 |
| | R17 = | 42.78 | | | |
| L11 | | | 4.00 | 1.634 | 49.8 |
| | R18 = | −34.10 | | | |

A lens stop with a clear aperture of 30.49 mm is positioned 23.86 mm after R18.

| EFL (mm) | Zoom Spacing | | FVD (mm) |
|---|---|---|---|
| | Z₁ (mm) | Z₂ (mm) | |
| 70.0 | .88 | 46.23 | 202.87 |
| 135.0 | 10.12 | 23.36 | 189.23 |
| 199.9 | 13.36 | .50 | 169.56 |

Another embodiment of an optical system according to this invention is given in Table V. In this embodiment Groups G1 and G2 are substantially the same as shown in FIG. 4. The object side positive sub-group of G3 in the embodiment is substantially the same as the corresponding sub-group shown in FIG. 3 and the image side negative sub-group of G3 is substantially the same as shown in FIG. 1.

A lens as described above scaled to an image frame of 24×36 mm and EFL's of 71.0 mm to 197.0 mm is substantially described in Table V.

TABLE V

| Element | | Radius of Curvature (mm) | Axial Distance Between Surfaces (mm) | $N_d$ | $V_d$ |
|---|---|---|---|---|---|
| L1 | R1 = | 81.68 | | | |
| | | | 3.50 | 1.805 | 25.5 |
| | R2 = | 42.51 | | | |
| L2 | | | 9.50 | 1.658 | 50.9 |
| | R3 = | −676.67 | | | |
| | | | .35 | | |
| | R4 = | 77.45 | | | |
| L3 | | | 6.60 | 1.487 | 70.4 |
| | R5 = | 1302.78 | | | |
| | | | Z1 | | |

TABLE V-continued

| | | | | | |
|---|---|---|---|---|---|
| L4 | R6 = | −470.54 | | | |
| | R7 = | 47.24 | 2.00 | 1.743 | 49.2 |
| | | | 4.80 | | |
| L5 | R8 = | −80.37 | | | |
| | R9 = | 28.12 | 2.00 | 1.743 | 49.2 |
| L6 | | | 5.00 | 1.805 | 25.5 |
| | R10 = | 186.79 | | | |
| | | | Z2 | | |
| L7 | R11 = | 60.07 | | | |
| | R12 = | −184.06 | 3.50 | 1.487 | 70.4 |
| | | | .20 | | |
| L8 | R13 = | 34.35 | | | |
| | R14 = | −75.82 | 6.50 | 1.487 | 70.4 |
| L9 | | | 1.50 | 1.728 | 28.3 |
| | R15 = | 192.84 | | | |
| | | | 48.78 | | |
| L10 | R16 = | −19.45 | | | |
| | R17 = | −42.98 | 2.00 | 1.806 | 40.7 |
| | | | .30 | | |
| L11 | R18 = | 186.54 | | | |
| | R19 = | −75.15 | 4.00 | 1.717 | 29.5 |

| | Zoom Spacing | | |
|---|---|---|---|
| EFL (mm) | Z1 (mm) | Z2 (mm) | FVD (mm) |
| 71.0 | 1.50 | 66.39 | 207.32 |
| 135.0 | 15.96 | 33.69 | 189.08 |
| 197.97 | 21.07 | 1.50 | 161.98 |

Another embodiment of an optical system according to this invention is given in Table VI. In this embodiment, Group G1 is substantially the same as shown in FIG. 1. Group G2 is substantially the same as shown in FIG. 3. The object side positive sub-group of G3 is substantially the same as shown in FIG. 3 and the image side negative sub-group of G3 is substantially the same as shown in FIG. 1.

A lens as described above scaled to an image frame of 24×36 mm and EFL's of 72.0 mm to 196.1 mm is substantially described in Table VI.

TABLE VI

| Element | Radius of Curvature (mm) | | Axial Distance Between Surfaces (mm) | $N_d$ | $V_d$ |
|---|---|---|---|---|---|
| L1 | R1 = | 96.76 | | | |
| | R2 = | −187.65 | 6.50 | 1.517 | 64.2 |
| | | | .20 | | |
| L2 | R3 = | 93.47 | | | |
| | R4 = | −116.67 | 8.10 | 1.517 | 64.2 |
| L3 | | | 3.50 | 1.755 | 27.5 |
| | R5 = | 589.22 | | | |
| | | | Z1 | | |
| L4 | R6 = | 557.43 | | | |
| | R7 = | 41.20 | 2.00 | 1.691 | 54.7 |
| | | | 4.00 | | |
| L5 | R8 = | −49.37 | | | |
| | R9 = | 25.90 | 2.00 | 1.640 | 60.2 |
| L6 | | | 5.35 | 1.679 | 30.8 |
| | R10 = | 522.41 | | | |
| | | | Z2 | | |
| L7 | R11 = | 52.43 | | | |
| | R12 = | −126.28 | 3.70 | 1.565 | 48.2 |
| | | | .20 | | |
| L8 | R13 = | 32.66 | | | |
| | R14 = | −71.33 | 6.80 | 1.517 | 64.2 |
| L9 | | | 2.73 | 1.785 | 25.7 |

TABLE VI-continued

| Element | Radius of Curvature (mm) | | Axial Distance Between Surfaces (mm) | $N_d$ | $V_d$ |
|---|---|---|---|---|---|
| | R15 = | 99.30 | | | |
| | | | 43.53 | | |
| L10 | R16 = | −18.06 | | | |
| | R17 = | −38.92 | 2.00 | 1.744 | 44.9 |
| | | | .20 | | |
| L11 | R18 = | 151.19 | | | |
| | R19 = | −66.42 | 3.40 | 1.663 | 32.8 |

A lens stop with a clear aperture of 25.37 mm is positioned 2.00 mm after R15 and 42.53 mm ahead of R16.

| | Zoom Spacing | | |
|---|---|---|---|
| EFL (mm) | Z1 (mm) | Z2 (mm) | FVD (mm) |
| 72.0 | 1.50 | 45.48 | 183.21 |
| 135.0 | 22.74 | 23.14 | 182.105 |
| 196.1 | 30.29 | 1.50 | 168.03 |

Another embodiment of an optical system according to this invention is given in Table VII. This embodiment is substantially the same as shown in FIG. 5, but G2 reverses the order of the singlet and doublet as shown in FIG. 5 so that the doublet is on the object side of the singlet.

A lens as described above scaled to an image frame of 24×36 mm and EFL's of 70.0 mm to 200.1 mm is substantially described in Table VII.

TABLE VII

| Element | Radius of Curvature (mm) | | Axial Distance Between Surfaces (mm) | $N_d$ | $V_d$ |
|---|---|---|---|---|---|
| L1 | R1 = | 62.78 | | | |
| | R2 = | 39.20 | 3.50 | 1.837 | 23.6 |
| L2 | | | 8.00 | 1.585 | 56.1 |
| | R3 = | 1101.93 | | | |
| | | | .35 | | |
| L3 | R4 = | 59.82 | | | |
| | R5 = | −965.01 | 5.00 | 1.469 | 71.0 |
| | | | Z1 | | |
| L4 | R6 = | −1904.32 | | | |
| | R7 = | −55.47 | 4.50 | 1.849 | 23.2 |
| L5 | | | 1.80 | 1.697 | 63.2 |
| | R8 = | 41.13 | | | |
| | | | 4.00 | | |
| L6 | R9 = | −52.09 | | | |
| | R10 = | 121.67 | 2.00 | 1.670 | 58.6 |
| | | | Z2 | | |
| L7 | R11 = | 43.19 | | | |
| | R12 = | −27.18 | 8.50 | 1.492 | 65.4 |
| L8 | | | 1.50 | 1.849 | 23.1 |
| | R13 = | −79.28 | | | |
| | | | 16.06 | | |
| L9 | R14 = | 112.81 | | | |
| | R15 = | −63.60 | 5.00 | 1.839 | 30.6 |
| | | | 17.00 | | |
| L10 | R16 = | −29.31 | | | |
| | R17 = | 47.23 | 2.00 | 1.744 | 48.8 |
| L11 | | | 4.00 | 1.491 | 76.1 |
| | R18 = | −45.85 | | | |

A lens stop with a clear aperture of 30.49 mm is positioned 25.72 mm after R18.

| | Zoom Spacing | | |
|---|---|---|---|
| EFL (mm) | $Z_1$ (mm) | $Z_2$ (mm) | FVD (mm) |
| 70.0 | .50 | 60.85 | 210.27 |
| 135.0 | 13.15 | 30.67 | 192.76 |
| 200.1 | 17.57 | .50 | 167.05 |

A lens, as shown in FIG. 6, scaled to an image frame of 24×36 mm and having an EFL of 60.0 mm to 172.0 mm is substantially described in Table VIII.

TABLE VIII

| Element | | Radius of Curvature (mm) | Axial Distance Between Surfaces (mm) | $N_d$ | $V_d$ |
|---|---|---|---|---|---|
| L1 | R1 = | 67.35 | | | |
| | | | 2.18 | 1.785 | 26.1 |
| | R2 = | 41.97 | | | |
| L2 | | | 4.79 | 1.487 | 70.4 |
| | R3 = | −410.49 | | | |
| | | | .07 | | |
| | R4 = | 68.06 | | | |
| L3 | | | 3.63 | 1.487 | 70.4 |
| | R5 = | −582.10 | | | |
| | | | Z1 | | |
| | R6 = | −459.30 | | | |
| L4 | | | 1.45 | 1.773 | 49.6 |
| | R7 = | 59.03 | | | |
| | | | 3.30 | | |
| | R8 = | −91.54 | | | |
| L5 | | | Z2 | | |
| | R9 = | 23.13 | | | |
| L6 | | | 2.97 | 1.805 | 25.5 |
| | R10 = | 84.79 | | | |
| | | | .15 | | |
| | R11 = | 47.33 | | | |
| L7 | | | 3.63 | 1.521 | 49.0 |
| | R12 = | −118.13 | | | |
| | | | .15 | | |
| | R13 = | 43.69 | | | |
| L8 | | | 3.63 | 1.486 | 68.2 |
| | R14 = | −61.11 | | | |
| L9 | | | 1.09 | 1.805 | 25.5 |
| | R15 = | 120.59 | | | |
| | | | 1.96 | | |
| | Aperture | | | | |
| | | | 42.21 | | |
| | R16 = | −17.52 | | | |
| L10 | | | 1.45 | 1.773 | 49.6 |
| | R17 = | −29.49 | | | |
| | | | .08 | | |
| | R18 = | 99.77 | | | |
| L11 | | | 2.18 | 1.706 | 30.6 |
| | R19 = | −207.96 | | | |

| | Zoom Spacing | | |
|---|---|---|---|
| | 60.0 mm | 100.0 mm | 172.0 mm |
| Z1 | 1.8 mm | 10.9 mm | 16.5 mm |
| Z2 | 47.3 mm | 30.8 mm | .96 mm |
| FVD | 162.5 mm | 155.1 mm | 130.9 mm |

Another embodiment of an optical system, as shown in FIG. 6 is set forth in Table IX. This lens scaled to an image frame of 24×36 mm and EFL's of 80.27 mm to 230.1 mm.

TABLE IX

| Lens | | Surface Radius (mm) | Axial Distance Between Surfaces | $N_d$ | $V_d$ |
|---|---|---|---|---|---|
| L1 | R1 = | 67.35 | | | |
| | | | 3.00 | 1.785 | 26.1 |
| | R2 = | 41.97 | | | |
| L2 | | | 6.60 | 1.487 | 70.4 |
| | R3 = | −410.49 | | | |
| | | | .10 | | |

TABLE IX-continued

| | R4 = | 68.06 | | | |
|---|---|---|---|---|---|
| L3 | | | 5.00 | 1.487 | 70.4 |
| | R5 = | −582.10 | | | |
| | | | Z1 | | |
| | R6 = | −459.30 | | | |
| L4 | | | 2.00 | 1.773 | 49.6 |
| | R7 = | 59.03 | | | |
| | | | 2.47 | | |
| | R8 = | −91.54 | | | |
| L5 | | | 2.00 | | |
| | R9 = | 23.13 | | | |
| L6 | | | 4.55 | 1.743 | 49.2 |
| | R10 = | 84.79 | | | |
| | | | Z2 | 1.805 | 25.5 |
| | R11 = | 47.33 | | | |
| L7 | | | 4.10 | 1.633 | 47.4 |
| | R12 = | −118.13 | | | |
| | | | .20 | | |
| | R13 = | 43.69 | | | |
| L8 | | | 5.00 | 1.517 | 64.2 |
| | R14 = | −611.11 | | | |
| L9 | | | 1.50 | 1.486 | 68.2 |
| | R15 = | 120.59 | | | |
| | | | 2.69 | | |
| | Aperture | | | | |
| | | | 56.01 | | |
| | R16 = | −21.05 | | | |
| L10 | | | 2.00 | 1.773 | 49.6 |
| | R17 = | −46.95 | | | |
| | | | .12 | | |
| | R18 = | 87.94 | | | |
| L11 | | | 3.00 | 1.766 | 27.3 |
| | R19 = | −590.13 | | | |

| | Zoom Spacing | | |
|---|---|---|---|
| EFL mm | $Z_1$ (mm) | $Z_2$ (mm) | FVD (mm) |
| 82.7 | 2.95 | 64.29 | 206.62 |
| 135.0 | 14.35 | 41.93 | 195.66 |
| 230.1 | 21.79 | 1.32 | 162.51 |

Figure 7:
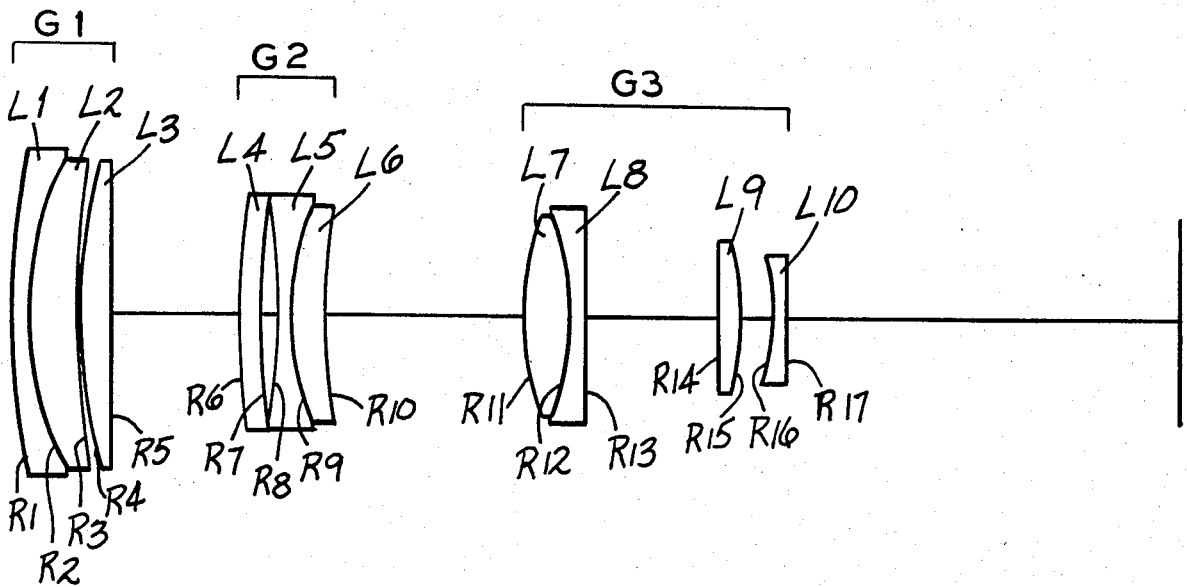

A lens scaled to an image frame of 24×36 mm and EFL's of 82.7 mm to 193.7 mm as shown in FIG. 7 is substantially described in Table X.

TABLE X

| Element | | Radius of Curvature (mm) | Axial Distance Between Surfaces (mm) | $N_d$ | $V_d$ |
|---|---|---|---|---|---|
| L1 | R1 = | 66.44 | | | |
| | | | 3.00 | 1.785 | 26.1 |
| | R2 = | 43.22 | | | |
| L2 | | | 8.10 | 1.517 | 64.2 |
| | R3 = | 203.20 | | | |
| | | | .10 | | |
| | R4 = | 80.51 | | | |
| L3 | | | 6.00 | 1.517 | 64.2 |
| | R5 = | −580.67 | | | |
| | | | Z1 | | |
| | R6 = | 114.92 | | | |
| L4 | | | 2.00 | 1.773 | 49.6 |
| | R7 = | 58.85 | | | |
| | | | 3.02 | | |
| | R8 = | −78.60 | | | |
| L5 | | | 2.00 | | |
| | R9 = | 23.35 | | | |
| L6 | | | 5.05 | 1.805 | 25.5 |
| | R10 = | 66.13 | | | |
| | | | Z2 | | |
| | R11 = | 29.27 | | | |
| L7 | | | 8.50 | 1.569 | 56.0 |
| | R12 = | −27.35 | | | |
| L8 | | | 1.50 | 1.785 | 25.7 |
| | R13 = | −205.30 | | | |
| | | | 1.00 | | |
| | Aperture | | | | |
| | | | 14.40 | | |
| | R14 = | 225.27 | | | 1.805 25.5 |
| L9 | | | 3.60 | | |
| | R15 = | −36.08 | | | |
| | | | 4.93 | | |

TABLE X-continued

| | | | | | |
|---|---|---|---|---|---|
| L10 | R16 | = −21.59 | 1.50 | 1.699 | 30.1 |
| | R17 | = −313.89 | | | |

Zoom Spacing

| | 82.7 mm | 135.2 mm | 193.7 mm |
|---|---|---|---|
| Z1 | 8.26 | 22.7 | 29.6 |
| Z2 | 53.4 | 28.5 | .687 |
| FVD | 196.2 | 185.8 | 164.8 |

Figure 9:
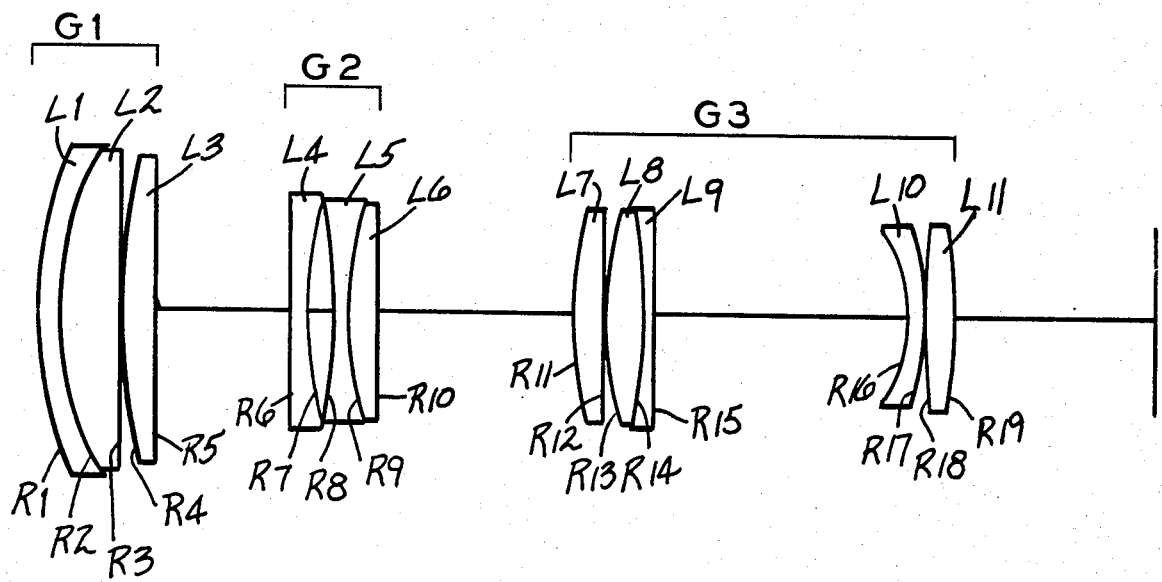

Another lens scaled to an image frame of 24×36 mm and EFL's of 82.7 mm to 193.7 mm is shown in FIG. 9 and described in Table XI.

TABLE XI

| Element | Radius of Curvature (mm) | Axial Distance Between Surfaces (mm) | $N_d$ | $V_d$ |
|---|---|---|---|---|
| L1 | R1 = 61.9 | | | |
| | | 3.00 | 1.785 | 26.1 |
| | R2 = 39.40 | | | |
| L2 | | 8.10 | 1.517 | 64.2 |
| | R3 = 143.15 | | | |
| | | .10 | | |
| | R4 = 69.85 | | | |
| L3 | | 6.00 | 1.517 | 64.2 |
| | R5 = −366.91 | | | |
| | | Z1 | | |
| | R6 = 125.63 | | | |
| L4 | | 2.00 | 1.834 | 37.3 |
| | R7 = 65.49 | | | |
| | | 3.85 | | |
| | R8 = −79.89 | | | |
| L5 | | 2.00 | 1.756 | 48.3 |
| | R9 = 22.26 | | | |
| L6 | | 5.05 | | |
| | R10 = 66.31 | | | |
| | | Z2 | | |
| | Aperature | | | |
| | | .50 | | |
| | R11 = 27.73 | | | |
| L7 | | 5.00 | 1.537 | 61.1 |
| | R12 = −78.71 | | | |
| | | .15 | | |
| | R13 = 23.40 | | | |
| L8 | | 3.90 | 1.489 | 74.9 |
| | R14 = 67.23 | | | |
| | | 1.30 | | |
| | R15 = −98.07 | | | |
| L9 | | 2.40 | 1.660 | 33.4 |
| | R16 = 20.17 | | | |
| | | 4.50 | | |
| | R17 = 222.67 | | | |
| L10 | | 3.50 | 1.796 | 25.6 |
| | R18 = −134.85 | | | |

Zoom Spacing

| | 82.6 mm | 135.1 mm | 193.6 mm |
|---|---|---|---|
| Z1 | 2.2 | 16.6 | 23.5 |
| Z2 | 53.4 | 28.4 | .7 |
| FVD | 196.2 | 185.7 | 164.8 |

Figure 8:
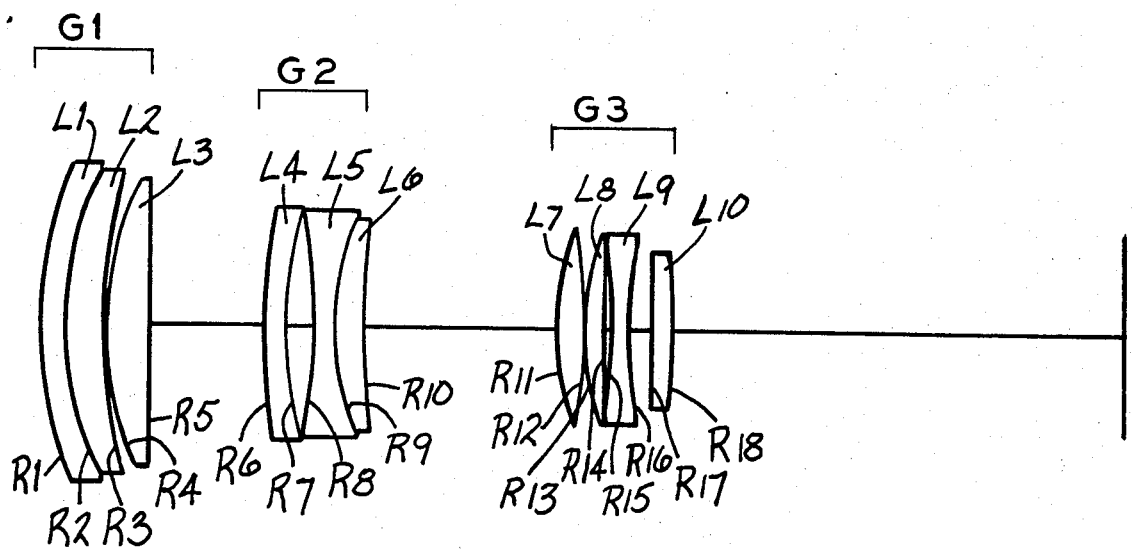

Another lens scaled to an image frame of 24×36 mm and EFL's of 82.6 mm to 193.6 mm is shown in FIG. 8 and substantially described in Table XII.

TABLE XII

| Element | Radius of Curvature (mm) | Axial Distance Between Surfaces (mm) | $N_d$ | $V_d$ |
|---|---|---|---|---|
| L1 | R1 = 117.60 | | | |
| | | 3.00 | 1.785 | 26.1 |
| | R2 = 60.14 | | | |
| L2 | | 8.10 | 1.517 | 64.2 |
| | R3 = −343.26 | | | |
| | | .10 | | |
| | R4 = 75.58 | | | |
| L3 | | 6.00 | 1.517 | 64.2 |
| | R5 = −960.00 | | | |
| | | Z1 | | |
| | R6 = −773.48 | | | |
| L4 | | 2.00 | 1.720 | 50.3 |
| | R7 = 55.15 | | | |
| | | 3.85 | | |
| | R8 = −78.38 | | | |
| L5 | | 2.00 | | |
| | R9 = 32.58 | | | |
| L6 | | 5.05 | 1.805 | 25.5 |
| | R10 = 219.88 | | | |
| | | Z2 | | |
| | R11 = 47.29 | | | |
| L7 | | 5.10 | 1.633 | 47.4 |
| | R12 = −567.96 | | | |
| | | .20 | | |
| | R13 = 38.90 | | | |
| L8 | | 5.40 | 1.517 | 64.2 |
| | R14 = −77.58 | | | |
| | | 1.50 | 1.805 | 25.5 |
| L9 | R15 = 141.59 | | | |
| | | 2.78 | | |
| | Aperture | | | |
| | | 54.95 | | |
| | R16 = −18.55 | | | |
| L10 | | 2.0 | | |
| | R17 = −47.18 | | | |
| | | .12 | 1.754 | 48.5 |
| | R18 = 127.66 | | | |
| L11 | | 3.90 | 1.609 | 37.3 |
| | R19 = −61.63 | | | |

Zoom Spacing

| | 82.7 mm | 135.2 mm | 193.7 mm |
|---|---|---|---|
| Z1 | 6.9 mm | 21.4 mm | 28.3 mm |
| Z2 | 54.7 mm | 29.3 mm | 1.5 mm |
| FVD | 196.2 mm | 185.8 mm | 164.8 mm |

As previously pointed out, there are certain parameters which must be satisfied to achieve the close focusing capability with minimum focusing travel. Table XIII sets forth the important parameters of each embodiment of this invention as previously mentioned.

TABLE XIII

| TABLE | $F_1/F_L$ | $K_D/K_S$ | T3 |
|---|---|---|---|
| I | .533 | .301 | .97 |
| II | .385 | 1.03 | 1.14 |
| III | .485 | .500 | .94 |
| IV | .263 | .436 | 1.26 |
| V | .389 | 1.25 | 1.06 |
| VI | .488 | .283 | 1.07 |
| VII | .348 | .795 | 1.23 |
| VIII | .322 | .725 | 1.08 |
| IX | .317 | .619 | .95 |
| X | .427 | .452 | 1.07 |
| XI | .426 | .265 | .97 |
| XII | .427 | .500 | .98 |

Where:
$F_1$ is the EFL of Group G1;
$F_L$ is the longest EFL of the lens;
$K_D$ is the power of the doublet component of the Group G1;
$K_I$ is the power of the singlet component of Group G1; and
T3 is the telephoto ratio of the third group when focused at infinity.

The ratio of the powers of the lens groups to the geometric mean of the powers of the lens at its extreme focal lengths is set forth in Table XIV.

TABLE XIV

|     | $K_1/K_M$ | $K_2/K_M$ | $K_3/K_M$ |
|-----|-----------|-----------|-----------|
| I   | 1.140     | −3.480    | 2.637     |
| II  | 1.537     | −3.428    | 2.116     |
| III | 1.288     | −3.097    | 2.151     |
| IV  | 2.246     | −5.437    | 2.388     |
| V   | 1.533     | −3.549    | 2.111     |
| VI  | 1.247     | −3.480    | 2.435     |
| VII | 1.702     | −4.043    | 2.104     |
| VIII| 1.87      | −4.30     | 2.66      |
| IX  | 1.87      | −4.30     | 2.29      |
| X   | 1.29      | −3.29     | 2.27      |
| XI  | 1.37      | −3.28     | 2.12      |
| XII | 1.37      | −3.30     | 2.36      |

It may thus be seen that the objects of the invention set forth as well as those made apparent from the foregoing description are efficiently attained. Embodiments of the invention have been set forth for purposes of disclosure, however, modifications to the disclosed embodiments of the invention as well as other embodiments thereof may occur to those skilled in the art. Accordingly, the appended claims are intended to cover all embodiments of the invention and modifications to the enclosed embodiments which do not depart from the spirit and scope of the invention.

What is claimed is:

1. A zoom lens comprising from the object end to the image end a first positive group, said first group comprising a doublet component and a singlet component, said first group being axially movable to focus the lens, a second negative group, said first and second groups being axially movable in predetermined relation to vary the equivalent focal length of the lens; and a third stationary positive group, the zoom lens satisfying the following relations, $$0.2 < F_1/F_L < 0.6$$

$$0.2 < K_D/K_S < 1.6$$

where $F_1$ is the equivalent focal length of the first groups, $F_L$ is the longest equivalent focal length of the zoom lens, $K_D$ is the optical power of the doublet component of the first group, and $K_S$ is the optical power of the singlet component of the first group.

2. A lens according to claim 1, wherein said second group consists of a negative singlet followed by a negative doublet.

3. A lens according to claim 1 wherein said second group consists of a negative doublet followed by a negative singlet.

4. A lens according to claim 1 wherein said third group comprises a positive subgroup at the object side widely spaced from a negative subgroup and the positive subgroup consists of a singlet followed by a doublet.

5. A lens according to claim 1 wherein said third group comprises a positive subgroup at the object side widely spaced from a negative subgroup and the positive subgroup consists of a doublet followed by a singlet.

6. A lens according to claim 1 wherein said third group comprises a positive subgroup at the object side widely spaced from a negative subgroup and the positive subgroup consists of a singlet followed by a doublet followed by a singlet.

7. A lens according to claim 1 wherein said third group comprises a positive subgroup at the object side widely spaced from a negative subgroup and the positive subgroup consists of two singlets.

8. A lens according to claim 1 wherein said third group comprises a positive subgroup at the object side widely spaced from a negative subgroup and the positive subgroup consists of a doublet.

9. A lens according to claim 1 scaled to an EFL of 72.0 mm to 195.8 mm substantially as described:

| Element | Radius of Curvature (mm) | Axial Distance Between Surfaces (mm) | Index of Refraction $N_d$ | Abbe No. $V_d$ |
|---------|--------------------------|--------------------------------------|---------------------------|----------------|
| L1  | R1 = 100.61   |       |       |      |
|     |               | 6.50  | 1.500 | 66.4 |
|     | R2 = −208.00  |       |       |      |
|     |               | .20   |       |      |
| L2  | R3 = 108.10   |       |       |      |
|     |               | 8.10  | 1.534 | 62.0 |
| L3  | R4 = −130.00  |       |       |      |
|     |               | 3.50  | 1.797 | 25.8 |
|     | R5 = 965.06   |       |       |      |
|     |               | Z1    |       |      |
|     | R6 = −608.86  |       |       |      |
| L4  |               | 2.30  | 1.794 | 48.2 |
|     | R7 = 21.02    |       |       |      |
| L5  |               | 5.10  | 1.847 | 23.9 |
|     | R8 = 47.40    |       |       |      |
|     |               | 3.81  |       |      |
|     | R9 = −61.93   |       |       |      |
| L6  |               | 2.00  | 1.815 | 44.9 |
|     | R10 = −717.67 |       |       |      |
|     |               | Z2    |       |      |
|     | R11 = 58.55   |       |       |      |
| L7  |               | 3.70  | 1.742 | 49.1 |
|     | R12 = −206.21 |       |       |      |
|     |               | .20   |       |      |
|     | R13 = 27.13   |       |       |      |
| L8  |               | 6.80  | 1.487 | 68.4 |
|     | R14 = −73.05  |       |       |      |
|     |               | .59   |       |      |
|     | R15 = −74.44  |       |       |      |
| L9  |               | 3.00  |       |      |
|     | R16 = 83.46   |       |       |      |
|     |               | 36.59 |       |      |
|     | R17 = −16.48  |       |       |      |
| L10 |               | 2.00  | 1.843 | 38.7 |
|     | R18 = −31.29  |       |       |      |
|     |               | .20   |       |      |
|     | R19 = 144.41  |       |       |      |
| L11 |               | 3.40  | 1.796 | 25.5 |
|     | R20 = −79.57  |       |       |      |

| EFL (mm) | $Z_1$ (mm) | $Z_2$ (mm) | FVD (mm) |
|----------|------------|------------|----------|
| 72.0     | 1.50       | 41.00      | 169.47   |
| 134.9    | 25.84      | 21.49      | 174.25   |
| 195.8    | 34.46      | 2.55       | 163.89   | where the lens comprises lens elements L1 to L11 having surfaces R1 to R20, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

10. A lens according to claim 1 scaled to an EFL of 70.0 mm to 199.9 mm substantially as described:

| Element | Radius of Curvature (mm) | Axial Distance Between Surfaces (mm) | Index of Refraction $N_d$ | Abbe No. $V_d$ |
|---------|--------------------------|--------------------------------------|---------------------------|----------------|
| L1 | R1 = 78.89  |      |       |      |
|    |             | 3.50 | 1.805 | 25.5 |
|    | R2 = 42.10  |      |       |      |

-continued

| Element | Radius of Curvature (mm) | Axial Distance Between Surfaces (mm) | Index of Refraction $N_d$ | Abbe No. $V_d$ |
|---|---|---|---|---|
| L2 | R3 = 6349.49 | 9.00 | 1.665 | 51.7 |
|  |  | .35 |  |  |
| L3 | R4 = 74.28 | 6.00 | 1.482 | 71.1 |
|  | R5 = −2197.53 | Z1 |  |  |
| L4 | R6 = −277.73 | 2.00 | 1.785 | 48.5 |
|  | R7 = 48.38 | 4.80 |  |  |
| L5 | R8 = −100.61 | 2.00 | 1.745 | 48.5 |
|  | R9 = 28.54 | 4.00 |  |  |
| L6 | R10 = 201.69 | Z2 | 1.817 | 25.0 |
| L7 | R11 = 80.69 | 3.50 | 1.487 | 70.4 |
|  | R12 = −195.77 | .20 |  |  |
| L8 | R13 = 32.44 | 6.50 | 1.487 | 70.4 |
|  | R14 = −90.94 |  |  |  |
| L9 | R15 = 212.82 | 1.50 | 1.793 | 26.0 |
|  |  | 32.94 |  |  |
| L10 | R16 = 225.23 | 5.00 | 1.805 | 25.5 |
|  | R17 = −131.05 | 8.02 |  |  |
| L11 | R18 = −24.27 | 2.00 | 1.809 | 40.4 |
|  | R19 = −55.49 |  |  |  |

| EFL (mm) | $Z_1$ (mm) | $Z_2$ (mm) | FVD (mm) |
|---|---|---|---|
| 70.0 | .50 | 71.45 | 212.94 |
| 135.0 | 15.31 | 35.97 | 192.27 |
| 199.9 | 20.50 | .50 | 161.95 | where the lens comprises lens elements L1 to L11 having surfaces R1 to R19, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

11. A lens according to claim 1 scaled to an EFL of 72.2 mm to 193.7 mm substantially as described:

| Element | Radius of Curvature (mm) | Axial Distance Between Surfaces (mm) | Index of Refraction $N_d$ | Abbe No. $V_d$ |
|---|---|---|---|---|
| L1 | R1 = 117.60 | 3.00 | 1.785 | 26.1 |
|  | R2 = 60.14 |  |  |  |
| L2 | R3 = −343.26 | 8.10 | 1.517 | 64.2 |
|  |  | .10 |  |  |
| L3 | R4 = 75.57 | 6.00 | 1.517 | 64.2 |
|  | R5 = −960.00 | Z1 |  |  |
| L4 | R6 = −773.48 | 2.00 | 1.720 | 50.3 |
|  | R7 = 55.15 | 3.85 |  |  |
| L5 | R8 = −78.38 | 2.00 | 1.743 | 49.2 |
|  | R9 = 32.58 |  |  |  |
| L6 | R10 = 219.88 | 5.05 | 1.805 | 25.5 |
|  |  | Z2 |  |  |
| L7 | R11 = 45.80 | 5.10 | 1.667 | 48.3 |
|  | R12 = −160.00 | .20 |  |  |
| L8 | R13 = 36.25 | 5.40 | 1.517 | 64.2 |
|  | R14 = −188.96 |  |  |  |
| L9 | R15 = 101.76 | 1.50 | 1.805 | 25.5 |
|  |  | 3.22 |  |  |
| L10 | R16 = −169.64 | 2.00 | 1.805 | 25.5 |
|  | R17 = 270.68 | 42.53 |  |  |
| L11 | R18 = −18.37 | 2.00 | 1.743 | 49.2 |
|  | R19 = −38.30 | .20 |  |  |
|  | R20 = 117.60 |  |  |  |
| L12 | R21 = −76.42 | 3.90 | 1.626 | 35.7 |

| EFL (mm) | $Z_1$ (mm) | $Z_2$ (mm) | FVD (mm) |
|---|---|---|---|
| 72.2 | 1.46 | 59.14 | 195.79 |
| 135.2 | 21.38 | 29.25 | 185.81 |
| 193.7 | 28.26 | 1.45 | 164.89 | where the lens comprises lens elements L1 to L12 having surfaces R1 to R21, the index of refraction is given by $N_d$, the dispersion is measured by the Abbe No. as given by $V_d$, $Z_1$ and $Z_2$ are the variable air spacings at the indicated equivalent focal length (EFL), the FVD is the front vertex distance, the distance between the front surface of L1 and the image plane, and all distances are given in millimeters (mm).

12. A lens according to claim 1 scaled to an EFL of 70.0 mm to 199.9 mm substantially as described:

| Element | Radius of Curvature (mm) | Axial Distance Between Surfaces (mm) | Index of Refraction $N_d$ | Abbe No. $V_d$ |
|---|---|---|---|---|
| L1 | R1 = 60.78 | 3.50 | 1.837 | 23.6 |
|  | R2 = 35.72 |  |  |  |
| L2 | R3 = −1501.55 | 9.00 | 15.54 | 59.5 |
|  |  | .35 |  |  |
| L3 | R4 = 37.45 | 7.00 | 1.485 | 68.5 |
|  | R5 = −807.56 | Z1 |  |  |
| L4 | R6 = −260.37 | 2.00 | 1.728 | 54.7 |
|  | R7 = 28.81 | 4.00 |  |  |
| L5 | R8 = −61.32 | 1.80 | 1.788 | 43.4 |
|  | R9 = 21.60 |  |  |  |
| L6 | R10 = 151.89 | 4.50 | 1.854 | 23.1 |
|  |  | Z2 |  |  |
| L7 | R11 = 50.66 | 8.50 | 1.492 | 65.4 |
|  | R12 = −27.43 |  |  |  |
| L8 | R13 = −66.89 | 1.50 | 1.849 | 23.1 |
|  |  | 9.99 |  |  |
| L9 | R14 = 91.86 | 5.00 | 1.794 | 34.7 |
|  | R15 = −84.59 | 25.25 |  |  |
| L10 | R16 = −29.20 | 2.00 | 1.860 | 42.5 |
|  | R17 = 42.78 |  |  |  |
| L11 | R18 = −34.10 | 4.00 | 1.634 | 49.8 |

| EFL (mm) | $Z_1$ (mm) | $Z_2$ (mm) | FVD (mm) |
|---|---|---|---|

-continued

| | | | |
|---|---|---|---|
| 70.0 | .88 | 46.23 | 202.87 |
| 135.0 | 10.12 | 23.36 | 189.23 |
| 199.9 | 13.36 | .50 | 169.56 | where the lens comprises lens elements L1 to L11 having surfaces R1 to R18, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

13. A lens according to claim 1 scaled to an EFL of 71.0 mm to 197.0 mm substantially as described:

| Element | Radius of Curvature (mm) | | Axial Distance Between Surfaces (mm) | Index of Refraction $N_d$ | Abbe No. $V_d$ |
|---|---|---|---|---|---|
| L1 | R1 = | 81.68 | | | |
| | | | 3.50 | 1.805 | 25.5 |
| | R2 = | 42.51 | | | |
| L2 | | | 9.50 | 1.658 | 50.9 |
| | R3 = | −676.67 | | | |
| | | | .35 | | |
| | R4 = | 77.45 | | | |
| L3 | | | 5.50 | 1.487 | 70.4 |
| | R5 = | 1302.78 | | | |
| | | | Z1 | | |
| | R6 = | −470.54 | | | |
| L4 | | | 2.00 | 1.743 | 49.2 |
| | R7 = | 47.24 | | | |
| | | | 4.80 | | |
| | R8 = | −80.37 | | | |
| L5 | | | 2.00 | 1.743 | 49.2 |
| | R9 = | 28.12 | | | |
| L6 | | | 5.00 | 1.805 | 25.5 |
| | R10 = | 186.79 | | | |
| | | | Z2 | | |
| | R11 = | 60.07 | | | |
| L7 | | | 3.50 | 1.487 | 70.4 |
| | R12 = | −184.06 | | | |
| | | | .20 | | |
| | R13 = | 34.35 | | | |
| L8 | | | 6.50 | 1.487 | 70.4 |
| | R14 = | −75.82 | | | |
| L9 | | | 1.50 | 1.728 | 28.3 |
| | R15 = | 192.84 | | | |
| | | | 48.78 | | |
| | R16 = | −19.45 | | | |
| L10 | | | 2.00 | 1.806 | 40.7 |
| | R17 = | −42.98 | | | |
| | | | .30 | | |
| | R18 = | 186.54 | | | |
| L11 | | | 4.00 | 1.717 | 29.5 |
| | R19 = | −75.15 | | | |

| EFL (mm) | $Z_1$ (mm) | $Z_2$ (mm) | FVD (mm) |
|---|---|---|---|
| 71.0 | 1.50 | 66.39 | 207.32 |
| 135.0 | 15.96 | 33.69 | 189.08 |
| 197.97 | 21.07 | 1.50 | 161.98 | where the lens comprises lens elements L1 to L11 having surfaces R1 to R19, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

14. A lens according to claim 1 scaled to an EFL of 72.0 mm to 196.1 mm substantially as described:

| Element | Radius of Curvature (mm) | | Axial Distance Between Surfaces (mm) | Index of Refraction $N_d$ | Abbe No. $V_d$ |
|---|---|---|---|---|---|
| L1 | R1 = | 96.76 | | | |
| | | | 6.50 | 1.517 | 64.2 |
| | R2 = | −187.65 | | | |
| | | | .20 | | |
| L2 | R3 = | 93.47 | | | |
| | | | 8.10 | 1.517 | 64.2 |
| | R4 = | −116.67 | | | |
| L3 | | | 3.50 | 1.755 | 27.5 |
| | R5 = | 589.22 | | | |
| | | | Z1 | | |
| | R6 = | 557.43 | | | |
| L4 | | | 2.00 | 1.691 | 54.7 |
| | R7 = | 41.20 | | | |
| | | | 4.00 | | |
| | R8 = | −49.37 | | | |
| L5 | | | 2.00 | 1.640 | 60.2 |
| | R9 = | 25.90 | | | |
| L6 | | | 5.35 | 1.679 | 30.8 |
| | R10 = | 522.41 | | | |
| | | | Z2 | | |
| | R11 = | 52.43 | | | |
| L7 | | | 3.70 | 1.565 | 48.2 |
| | R12 = | −126.28 | | | |
| | | | .20 | | |
| | R13 = | 32.66 | | | |
| L8 | | | 6.80 | 1.517 | 64.2 |
| | R14 = | −71.33 | | | |
| L9 | | | 2.73 | 1.785 | 25.7 |
| | R15 = | 99.30 | | | |
| | | | 43.53 | | |
| | R16 = | −18.06 | | | |
| L10 | | | 2.00 | 1.744 | 44.9 |
| | R17 = | −38.92 | | | |
| | | | .20 | | |
| | R18 = | 151.19 | | | |
| L11 | | | 3.40 | 1.663 | 32.8 |
| | R19 = | −66.42 | | | |

| EFL (mm) | $Z_1$ (mm) | $Z_2$ (mm) | FVD (mm) |
|---|---|---|---|
| 72.0 | 1.50 | 45.48 | 183.21 |
| 135.0 | 22.74 | 23.14 | 182.105 |
| 196.1 | 30.29 | 1.50 | 168.03 | where the lens comprises lens elements L1 to L11 having surfaces R1 to R19, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

15. A lens according to claim 1 scaled to an EFL of 70.0 mm to 200.1 mm substantially as described:

| Element | Radius of Curvature (mm) | | Axial Distance Between Surfaces (mm) | Index of Refraction $N_d$ | Abbe No. $V_d$ |
|---|---|---|---|---|---|
| L1 | R1 = | 62.78 | | | |
| | | | 3.50 | 1.837 | 23.6 |
| | R2 = | 39.20 | | | |
| L2 | | | 8.00 | 1.585 | 56.1 |
| | R3 = | 1101.93 | | | |
| | | | .35 | | |
| | R4 = | 59.82 | | | |
| L3 | | | 5.00 | 1.469 | 71.0 |
| | R5 = | −965.01 | | | |
| | | | Z1 | | |
| | R6 = | −1904.32 | | | |
| L4 | | | 4.50 | 1.849 | 23.2 |
| | R7 = | −55.47 | | | |
| L5 | | | 1.80 | 1.697 | 63.2 |
| | R8 = | 41.13 | | | |

-continued

| Element | Radius of Curvature (mm) | Axial Distance Between Surfaces (mm) | $N_d$ | $V_d$ |
|---|---|---|---|---|
| L6 | R9 = −52.09 | 4.00 | | |
| | R10 = 121.67 | 2.00 | 1.670 | 58.6 |
| | | Z2 | | |
| L7 | R11 = 43.19 | 8.50 | 1.492 | 65.4 |
| | R12 = −27.18 | | | |
| L8 | R13 = −79.28 | 1.50 | 1.849 | 23.1 |
| | R14 = 112.81 | 16.06 | | |
| L9 | R15 = −63.60 | 5.00 | 1.839 | 30.6 |
| | R16 = −29.31 | 17.00 | | |
| L10 | R17 = 47.23 | 2.00 | 1.744 | 48.8 |
| L11 | R18 = −45.85 | 4.00 | 1.491 | 76.1 |

| EFL (mm) | $Z_1$ (mm) | $Z_2$ (mm) | FVD (mm) |
|---|---|---|---|
| 70.0 | .50 | 60.85 | 210.27 |
| 135.0 | 13.15 | 30.67 | 192.67 |
| 200.1 | 17.57 | .50 | 167.05 | where the lens comprises lens elements L1 to L11 having surfaces R1 to R18, the index of refraction is given by $N_d$, the dispersion is measured by the Abbe No. as given by $V_d$, $Z_1$ and $Z_2$ are the variable air spacings at the indicated equivalent focal length (EFL), and FVD is the front vertex distance, the distance between the front surface of L1 and the image plane, and all distances are given in millimeters (mm).

16. A lens according to claim 1 scaled to an EFL of 60.0 mm to 172.0 mm substantially as described:

| Element | Radius of Curvature (mm) | Axial Distance Between Surfaces (mm) | $N_d$ | $V_d$ |
|---|---|---|---|---|
| L1 | R1 = 67.35 | 2.18 | 1.785 | 26.1 |
| L2 | R2 = 41.97 | 4.79 | 1.487 | 70.4 |
| | R3 = −410.49 | .07 | | |
| L3 | R4 = 68.06 | 3.63 | 1.487 | 70.4 |
| | R5 = −582.10 | Z1 | | |
| L4 | R6 = −459.30 | 1.45 | 1.773 | 49.6 |
| | R7 = 59.03 | 3.30 | | |
| L5 | R8 = −91.54 | | | |
| L6 | R9 = 23.13 | 2.97 | 1.805 | 25.5 |
| | R10 = 84.79 | .15 | | |
| L7 | R11 = 47.33 | 3.63 | 1.521 | 49.0 |
| | R12 = −118.13 | .15 | | |
| L8 | R13 = 43.69 | 3.63 | 1.486 | 68.2 |
| | R14 = −61.11 | 1.09 | 1.805 | 25.5 |
| L9 | R15 = 120.59 | 1.96 | | |
| | Aperture | 42.21 | | |
| L10 | R16 = −17.52 | 1.45 | 1.773 | 49.6 |
| | R17 = −29.49 | .08 | | |
| | R18 = 99.77 | | | |
| L11 | R19 = −207.96 | 2.18 | 1.706 | 30.6 |

| Zoom Spacing | | | |
|---|---|---|---|
| | 60.0 mm | 100.0 mm | 172.0 mm |
| Z1 | 1.8 mm | 10.9 mm | 16.5 mm |
| Z2 | 47.3 mm | 30.8 mm | .96 mm |
| FVD | 162.5 mm | 155.1 mm | 130.9 mm | where the lens comprises lens elements L1 to L11 having surfaces R1 to R19, the index of refraction is given by $N_d$, the dispersion is measured by the Abbe No. as given by $V_d$, $Z_1$ and $Z_2$ are the variable air spacings at the indicated equivalent focal length (EFL).

17. A lens according to claim 1 scaled to an EFL of 80.27 mm to 230.1 mm. substantially as described:

| Lens | Surface Radius (mm) | Axial Distance Between Surfaces | $N_d$ | $V_d$ |
|---|---|---|---|---|
| L1 | R1 = 67.35 | 3.00 | 1.785 | 26.1 |
| L2 | R2 = 41.97 | 6.60 | 1.487 | 70.4 |
| | R3 = −410.49 | .10 | | |
| L3 | R4 = 68.06 | 5.00 | 1.487 | 70.4 |
| | R5 = −582.10 | Z1 | | |
| L4 | R6 = −459.30 | 2.00 | 1.773 | 49.6 |
| | R7 = 59.03 | 2.47 | | |
| L5 | R8 = −91.54 | 2.00 | | |
| L6 | R9 = 23.13 | 4.55 | 1.743 | 49.2 |
| | R10 = 84.79 | Z2 | 1.805 | 25.5 |
| L7 | R11 = 47.33 | 4.10 | 1.633 | 47.4 |
| | R12 = −118.13 | .20 | | |
| L8 | R13 = 43.69 | 5.00 | 1.517 | 64.2 |
| L9 | R14 = −611.11 | 1.50 | 1.486 | 68.2 |
| | R15 = 120.59 | 2.69 | | |
| | Aperture | 56.01 | | |
| L10 | R16 = −21.05 | 2.00 | 1.773 | 49.6 |
| | R17 = −46.95 | .12 | | |
| | R18 = 87.94 | | | |
| L11 | R19 = −590.13 | 3.00 | 1.766 | 27.3 |

| Zoom Spacing | | | |
|---|---|---|---|
| EFL mm | $Z_1$ (mm) | $Z_2$ (mm) | FVD (mm) |
| 82.7 | 2.95 | 64.29 | 206.62 |
| 135.0 | 14.35 | 41.93 | 195.66 |
| 230.1 | 21.79 | 1.32 | 162.51 | where the lens comprises lens elements L1 to L11 having surfaces R1 to R19, the index of refraction is given by $N_d$, the dispersion is measured by the Abbe No. as given by $V_d$, $Z_1$ and $Z_2$ are the variable air spacings at the indicated focal length (EFL), and FVD is the front vertex distance, the distance between the front surface of L1 and the image plane, and all distances are given in millimeters (mm).

18. A lens according to claim 1 scaled to an EFL of 82.7 mm to 193.7 mm substantially as described:

| Element | Radius of Curvature (mm) | | Axial Distance Between Surfaces (mm) | $N_d$ | $V_d$ |
|---|---|---|---|---|---|
| L1 | R1 = | 66.44 | | | |
| | | | 3.00 | 1.785 | 26.1 |
| | R2 = | 43.22 | | | |
| L2 | | | 8.10 | 1.517 | 64.2 |
| | R3 = | 203.20 | | | |
| | | | .10 | | |
| | R4 = | 80.51 | | | |
| L3 | | | 6.00 | 1.517 | 64.2 |
| | R5 = | −580.67 | | | |
| | | | Z1 | | |
| | R6 = | 114.92 | | | |
| L4 | | | 2.00 | 1.773 | 49.6 |
| | R7 = | 58.85 | | | |
| | | | 3.02 | | |
| | R8 = | −78.60 | | | |
| L5 | | | 2.00 | | |
| | R9 = | 23.35 | | | |
| L6 | | | 5.05 | 1.805 | 25.5 |
| | R10 = | 66.13 | | | |
| | | | Z2 | | |
| | R11 = | 29.27 | | | |
| L7 | | | 8.50 | 1.569 | 56.0 |
| | R12 = | −27.35 | | | |
| L8 | | | 1.50 | 1.785 | 25.7 |
| | R13 = | −205.30 | | | |
| | | | 1.00 | | |
| | Aperture | | | | |
| | | | 14.40 | | |
| | R14 = | 225.27 | | | |
| L9 | | | 3.60 | 1.805 | 25.5 |
| | R15 = | −36.08 | | | |
| | | | 4.93 | | |
| | R16 = | −21.59 | | | |
| L10 | | | 1.50 | 1.699 | 30.1 |
| | R17 = | −313.89 | | | |

| Zoom Spacing | | | |
|---|---|---|---|
| | 82.7 mm | 135.2 mm | 193.7 mm |
| Z1 | 8.26 | 22.7 | 29.6 |
| Z2 | 53.4 | 28.5 | .687 |
| FVD | 196.2 | 185.8 | 164.8 | wherein the lens comprises lens elements L1 to L10 having surfaces R1 to R7, the index of refraction is given by $N_d$, the dispersion is measured by the Abbe No. as given by $V_d$, $Z_1$ and $Z_2$ are the variable air spacings at the indicated equivalent focal length (EFL).

19. A lens according to claim 1 scaled to an EFL of 82.7 to 193.7 substantially as described:

TABLE XI

| Element | Radius of Curvature (mm) | | Axial Distance Between Surfaces (mm) | $N_d$ | $V_d$ |
|---|---|---|---|---|---|
| L1 | R1 = | 61.9 | | | |
| | | | 3.00 | 1.785 | 26.1 |
| | R2 = | 39.40 | | | |
| L2 | | | 8.10 | 1.517 | 64.2 |
| | R3 = | 143.15 | | | |
| | | | .10 | | |
| | R4 = | 69.85 | | | |
| L3 | | | 6.00 | 1.517 | 64.2 |
| | R5 = | −366.91 | | | |
| | | | Z1 | | |
| | R6 = | 125.63 | | | |
| L4 | | | 2.00 | 1.834 | 37.3 |
| | R7 = | 65.49 | | | |
| | | | 3.85 | | |
| | R8 = | −79.89 | | | |
| L5 | | | 2.00 | 1.756 | 48.3 |
| | R9 = | 22.26 | | | |
| L6 | | | 5.05 | | |
| | R10 = | 66.31 | | | |
| | | | Z2 | | |
| | | Aperture | | | |
| | R11 = | 27.73 | | .50 | |
| L7 | | | 5.00 | 1.537 | 61.1 |
| | R12 = | −78.71 | | | |
| | | | .15 | | |
| | R13 = | 23.40 | | | |
| L8 | | | 3.90 | 1.489 | 74.9 |
| | R14 = | 67.23 | | | |
| | | | 1.30 | | |
| | R15 = | −98.07 | | | |
| L9 | | | 2.40 | 1.660 | 33.4 |
| | R16 = | 20.17 | | | |
| | | | 4.50 | | |
| | R17 = | 222.67 | | | |
| L10 | | | 3.50 | 1.796 | 25.6 |
| | R18 = | −134.85 | | | |

| Zoom Spacing | | | |
|---|---|---|---|
| | 82.6 mm | 135.1 mm | 193.6 mm |
| Z1 | 2.2 | 16.6 | 23.5 |
| Z2 | 53.4 | 28.4 | .7 |
| FVD | 196.2 | 185.7 | 164.8 | wherein the lens comprises lens elements L1 to L10 having surfaces R1 to R18, the index of refraction is given by $N_d$, the dispersion is measured by the Abbe No. as given by $V_d$, $Z_1$ and $Z_2$ are the variable air spacings at the indicated equivalent focal length (EFL).

20. A zoom lens comprising from the object end a first positive group, a second negative group and a third positive group, said first and second groups being axially movable in predetermined relation to vary the equivalent focal length of said lens, said first group being axially movable for focusing, said third group being stationary during change in equivalent focal length, and $$2.0 > K_1/K_M > 1.0$$

$$-6.0 > K_2/K_M > -3.0$$

$$3.0 > K_3/K_M > 2.0$$

where $K_1$, $K_2$, and $K_3$ are the optical powers expressed as the reciprocal of the equivalent focal lengths in millimeters of the first, second and third groups, respectively, and $K_M$ is the geometric mean power of the lens.

21. The lens of claim 20 where said first group comprises a positive doublet and a positive singlet and $$0.6 > F_1/F_L > 0.2$$

$$1.6 > K_D/K_S > 0.2$$

where $F_1$ is the equivalent focal length of the first group; $F_L$ is the maximum equivalent focal length of the lens; $K_D$ is the optical power of the doublet; and $K_S$ is the optical power of the singlet.

22. The lens of claim 20 where the telephoto ratio of the third group is less than 1.4.

23. A zoom lens comprising from the object end a first positive group, a second negative group, and a third positive group, said first group being axially movable to focus the lens, said first and second groups being axially movable in predetermined relationship to vary the equivalent focal length of the lens, said third lens group being stationary, said first, second, and third groups having optical powers $K_1$, $K_2$, and $K_3$, respectively, and $$2.0 > K_1/K_M > 1.0$$

$$-6.0 > K_2/K_M > -3.0$$

$$3.0 > K_3/K_M > 2.0$$

where $K_M$ is the geometrical means of the extreme equivalent focal lengths of the lens, and $$0.6 > F_1/F_L > 0.2$$

where $F_1$ is the equivalent focal length of the first group, and $F_L$ is the longest equivalent focal length of the lens.

24. The lens of claims 1, 20, or 23, where the telephoto ratio of the third group of said lens is less than 1.3.

25. The lens of claim 23 wherein the first group consists of a positive doublet and a positive singlet, and $$1.6 > K_D/K_S > 0.2$$

where $K_D$ is the optical power of the doublet and $K_S$ is the optical power of the singlet.

26. A lens according to claim 23 wherein said third group comprises a positive subgroup at the object side widely spaced from a negative subgroup and the positive subgroup consists of a singlet followed by a doublet.

27. A lens according to claim 23 wherein said third group comprises a positive subgroup at the object side widely spaced from a negative subgroup and the positive subgroup consists of a doublet followed by a singlet.

28. A lens according to claim 23 wherein said third group comprises a positive subgroup at the object side widely spaced from a negative subgroup and the positive subgroup consists of a singlet followed by a doublet followed by a singlet.

29. A lens according to claim 23 wherein said third group comprises a positive subgroup at the object side widely spaced from a negative subgroup and the positive subgroup consists of two singlets.

30. A lens according to claim 23 wherein said third group comprises a positive subgroup at the object side widely spaced from a negative subgroup and the positive subgroup consists of a doublet.

* * * * *